(12) United States Patent
Yamaguchi et al.

(10) Patent No.: US 11,328,606 B2
(45) Date of Patent: May 10, 2022

(54) HAZARDOUS VEHICLE PREDICTION DEVICE, HAZARDOUS VEHICLE WARNING SYSTEM, AND HAZARDOUS VEHICLE PREDICTION METHOD

(71) Applicant: Mitsubishi Electric Corporation, Tokyo (JP)

(72) Inventors: Tomotsugu Yamaguchi, Tokyo (JP); Kanehide Arai, Tokyo (JP); Kentaro Sakanashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 308 days.

(21) Appl. No.: 16/612,112

(22) PCT Filed: Jun. 7, 2017

(86) PCT No.: PCT/JP2017/021125
§ 371 (c)(1),
(2) Date: Nov. 8, 2019

(87) PCT Pub. No.: WO2018/225178
PCT Pub. Date: Dec. 13, 2018

(65) Prior Publication Data
US 2020/0168099 A1    May 28, 2020

(51) Int. Cl.
*G08G 1/16* (2006.01)
*G06F 16/23* (2019.01)
(Continued)

(52) U.S. Cl.
CPC ............... *G08G 1/167* (2013.01); *B60R 1/00* (2013.01); *G02B 27/0101* (2013.01);
(Continued)

(58) Field of Classification Search
CPC ...... G08G 1/167; G08G 1/0112; G08G 1/166; G08G 1/09626; B60R 1/00;
(Continued)

(56) References Cited

U.S. PATENT DOCUMENTS

| 2015/0317523 A1* | 11/2015 | Clark | ................... G06K 9/3258 348/148 |
| 2017/0186320 A1* | 6/2017 | Lai | .......................... G08G 1/012 |

FOREIGN PATENT DOCUMENTS

| JP | 2002-342883 A | 11/2002 |
| JP | 2005-56068 A | 3/2005 |

(Continued)

OTHER PUBLICATIONS

International Search Report (PCT/ISA/210) issued in PCT/JP2017/021125, dated Aug. 22, 2017.
(Continued)

*Primary Examiner* — James M Pontius
(74) *Attorney, Agent, or Firm* — Birch, Stewart, Kolasch & Birch, LLP (57) ABSTRACT

A hazardous behavior determining unit (3) determines a vehicle that is conducting or is likely to conduct hazardous driving from among one or more vehicles around a host vehicle and a type of the hazardous driving using information indicating states of the host vehicle and the vehicles and a surrounding situation and behavior information stored in an onboard database (2). A registered vehicle identifying unit (5) identifies a vehicle that corresponds to hazardous vehicle information stored in the onboard database (2) by collating numbers of a license plate detected by a number detecting unit (4) with numbers stored in the onboard database (2). A hazard predicting unit (6) predicts a risk to the host vehicle using the determination result from the
(Continued)

hazardous behavior determining unit (3) and the identification result from the registered vehicle identifying unit (5).

7 Claims, 6 Drawing Sheets

(51) Int. Cl.
*B60R 1/00* (2022.01)
*G02B 27/01* (2006.01)
*G06N 5/04* (2006.01)
*G08G 1/01* (2006.01)
*G06V 20/20* (2022.01)
*G06V 20/58* (2022.01)
*G06V 20/62* (2022.01)

(52) U.S. Cl.
CPC ............ *G06F 16/2379* (2019.01); *G06N 5/04* (2013.01); *G06V 20/20* (2022.01); *G06V 20/58* (2022.01); *G08G 1/0112* (2013.01); *G08G 1/166* (2013.01); *B60R 2300/10* (2013.01); *B60R 2300/205* (2013.01); *B60R 2300/804* (2013.01); *B60R 2300/8066* (2013.01); *B60R 2300/8093* (2013.01); *G02B 2027/014* (2013.01); *G02B 2027/0138* (2013.01); *G02B 2027/0141* (2013.01); *G06V 20/625* (2022.01)

(58) Field of Classification Search
CPC .......... B60R 2300/10; B60R 2300/205; B60R 2300/804; B60R 2300/8066; B60R 2300/8093; B60R 21/013; B60R 2300/308; G02B 27/0101; G02B 2027/0138; G02B 2027/014; G02B 2027/0141; G02B 27/01; G06F 16/2379; G06F 16/5846; G06K 9/00671; G06K 9/00805; G06K 2209/15; G06K 9/00825; G06N 5/04; B60W 40/04
See application file for complete search history.

(56) References Cited

FOREIGN PATENT DOCUMENTS

| | | |
|---|---|---|
| JP | 2010-173619 A | 8/2010 |
| JP | 2011-100409 A | 5/2011 |
| JP | 2013-33324 A | 2/2013 |
| JP | 2016-139181 A | 8/2016 |
| JP | 2017-30600 A | 2/2017 |

OTHER PUBLICATIONS

Notice of Reasons for Refusal issued in corresponding Japanese Application No. 2019-523264 dated Jan. 21, 2020.

\* cited by examiner

| State of Host Vehicle | Traveling Speed<br>Inter-Vehicle Distance from Preceding Vehicle<br>Inter-Vehicle Distance from Subsequent Vehicle |
|---|---|
| State of Different Vehicle | Traveling Speed<br>Inter-Vehicle Distance from Host Vehicle<br>Inter-Vehicle Distance from Preceding Vehicle<br>Inter-Vehicle Distance from Subsequent Vehicle<br>Type of Vehicle (Passenger Cars, Trucks, Kei Cars (Mini Cars), Two-Wheelers, Vans, Etc.) |
| Surrounding Situation | Type of Road (Expressway or Ordinary Road)<br>Number of Lanes<br>Road Width<br>Type of Road Surface (Paved or Unpaved)<br>Condition of Road Surface (Dry, Wet, or Covered with Snow)<br>Inclination of Road Surface (Flat, Uphill, or Downhill)<br>Weather<br>Time of Day<br>Illuminance |

FIG. 3

| Numbers of License Plate of Vehicle | Type of Hazardous Driving | Situation in Which Hazardous Driving Is Likely to Be Conducted |
|---|---|---|
| Hyogo 111 A 11-11 | Cutting Vehicle Off | (Example) Highly Likely Under Conditions Below<br>[Situation of Host Vehicle]<br>* Speed Less Than or Equal to 50 km/h<br>* Distance from Preceding Vehicle More Than or Equal to 10 m<br>[Situation of Different Vehicle]<br>Not Relevant<br>[Situation of Road]<br>Straight Road More Than or Equal to 50 m |
| | Speed Limit Violation | (Example) Highly Likely Under Conditions Below<br>[Situation of Host Vehicle]<br>Not Relevant<br>[Situation of Different Vehicle]<br>Distance from Preceding Vehicle More Than or Equal to 100 m<br>[Situation of Road]<br>* Straight Road More Than or Equal to 100 m<br>* Downhill Having Inclination More Than or Equal to 5% |
| Kagoshima 222 A 22-22 | Abrupt Braking | (Example) Highly Likely Under Conditions Below<br>[Situation of Host Vehicle]<br>Not Relevant<br>[Situation of Different Vehicle]<br>* Distance from Preceding Vehicle Less Than or Equal to 10 m<br>* Speed Faster Than or Equal to 50 km/h<br>[Situation of Road]<br>Not Relevant |

FIG. 11

HAZARDOUS VEHICLE PREDICTION DEVICE, HAZARDOUS VEHICLE WARNING SYSTEM, AND HAZARDOUS VEHICLE PREDICTION METHOD

TECHNICAL FIELD

The present invention relates to a hazardous vehicle prediction device, a hazardous vehicle warning system, and a hazardous vehicle prediction method for predicting and notifying a risk that a vehicle poses on a host vehicle.

BACKGROUND ART

Conventional hazardous vehicle prediction devices each have a function of notifying a driver of a host vehicle of a risk that another vehicle poses on the host vehicle. In conventional hazardous vehicle prediction devices, roughly, the following two approaches are employed.

A first approach is to capture license plate information of a vehicle that is conducting hazardous driving and to store the information in a database, and warning information is output to a driver thereafter when a vehicle that matches the license plate information stored in the database is detected (for example, see Patent Literature 1).

A second approach is to accumulate behavior information indicating the behavior of other vehicles from the past to the present, and a vehicle that may possibly pose a danger in the near future is predicted on the basis of the accumulated behavior information and announced to a driver (for example, see Patent Literature 2).

CITATION LIST

Patent Literatures

Patent Literature 1: JP 2005-56068 A
Patent Literature 2: JP 2006-85285 A

SUMMARY OF INVENTION

Technical Problem

In the first approach, it is determined to be hazardous when a vehicle that matches the license plate information stored in the database is detected, and warning information is output to the driver regardless of the situation of the host vehicle and the surrounding situation. Therefore, the first approach may lead the warning information to be output even when the situations prevent the detected vehicle from conducting hazardous driving, in which case the unnecessary warning information causes the driver to feel stressed.

The second approach requires a procedure for accumulating behavior information on other vehicles before prediction of a hazard. Therefore, in the second approach it is difficult to perform prompt and appropriate announcement when accumulation of the behavior information on other vehicles is not sufficient.

The present invention has been made to solve the problems as described above, and an object of the invention is to promptly predict hazardous driving of other vehicles and is to suppress unnecessary notifications.

Solution to Problem

A hazardous vehicle prediction device according to the present invention includes: a processor to execute a program; and a memory to store a database storing behavior information indicating behavior of hazardous driving and hazardous vehicle information indicating numbers of a license plate of a vehicle which has conducted hazardous driving before and a type of the hazardous driving of the vehicle, and to store the program which, when executed by the processor, performs processes of, determining a vehicle that is conducting or is likely to conduct hazardous driving from among one or more vehicles around a host vehicle and a type of the hazardous driving using information indicating states of the host vehicle and the vehicles and a surrounding situation and the behavior information stored in the database; detecting a license plate from image data on the vehicles captured by a camera mounted on the host vehicle; identifying a vehicle that corresponds to the hazardous vehicle information stored in the database by collating numbers of the license plate detected with the numbers stored in the database; predicting a risk to the host vehicle using the determination result and the identification result; and performing control to notify a driver of the host vehicle of the prediction result.

Advantageous Effects of Invention

According to the present invention, a risk to the host vehicle is predicted using the determination result from the hazardous behavior determining unit and the identification result from the registered vehicle identifying unit, and thus it is possible to promptly predict hazardous driving of other vehicles and to suppress unnecessary notifications.

DESCRIPTION OF EMBODIMENTS

To describe the invention further in detail, an embodiment for carrying out the invention will be described below with reference to the accompanying drawings.

First Embodiment

Figure 1:
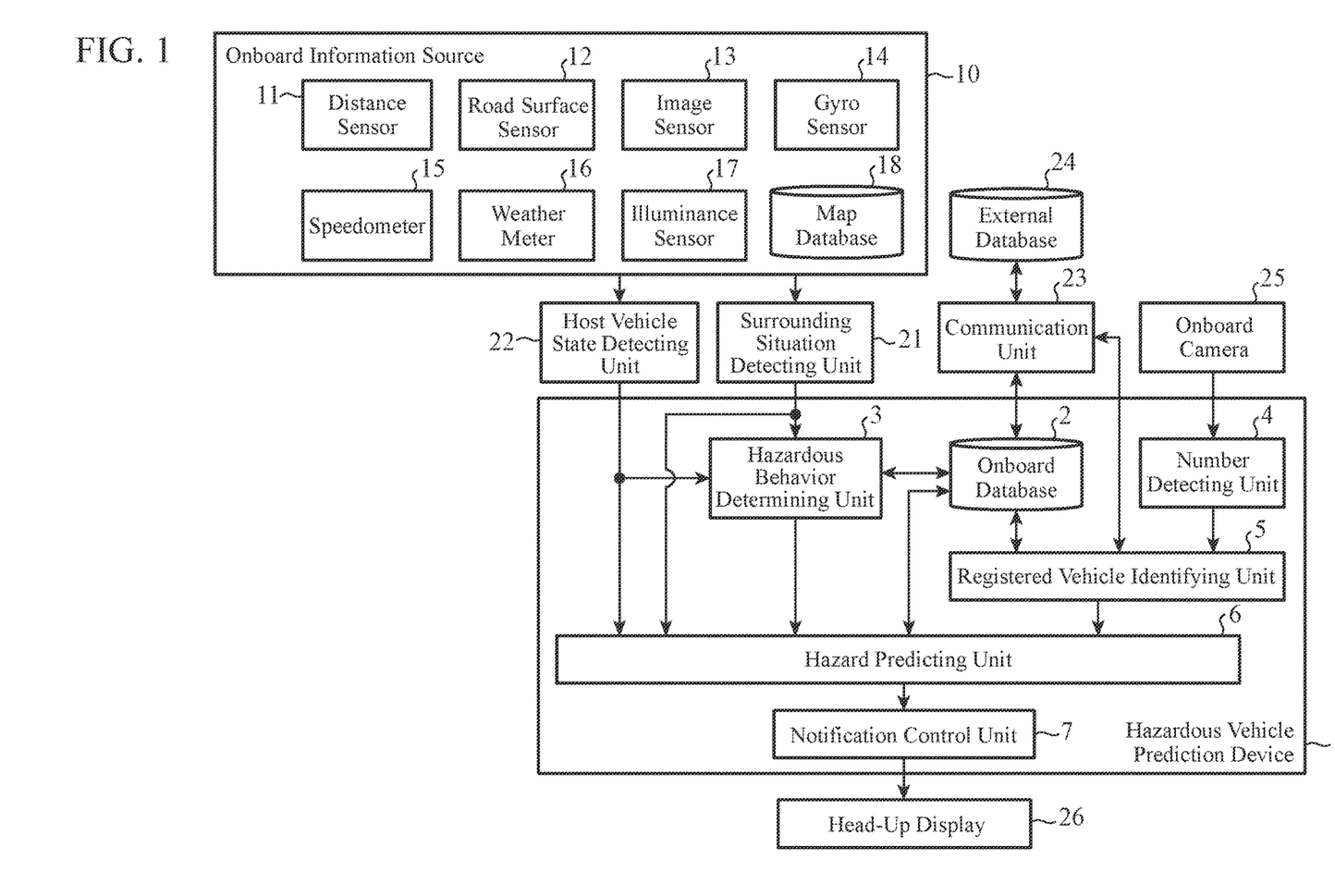
FIG. 1 is a block diagram illustrating an exemplary configuration of a hazardous vehicle warning system according to a first embodiment of the present invention.

FIG. 1 is a block diagram illustrating an exemplary configuration of a hazardous vehicle warning system according to a first embodiment of the present invention. The hazardous vehicle warning system includes a hazardous vehicle prediction device 1, an onboard information source 10, a surrounding situation detecting unit 21, a host vehicle state detecting unit 22, a communication unit 23, an onboard camera 25, and a head-up display 26 which are mounted on a vehicle, and an external database 24 belonging to an external organization outside the vehicle. The hazardous vehicle prediction device 1 includes an onboard database 2, a hazardous behavior determining unit 3, a number detecting unit 4, a registered vehicle identifying unit 5, a hazard predicting unit 6, and a notification control unit 7. The hazardous vehicle prediction device 1 exchanges information with the onboard information source 10, the surrounding situation detecting unit 21, the host vehicle state detecting unit 22, the onboard camera 25, and the head-up display 26 which are mounted on the same vehicle as the hazardous vehicle prediction device 1. The hazardous vehicle prediction device 1 also exchanges information with the external database 24 using wireless communication of the communication unit 23.

The onboard information source 10 includes, for example, a distance sensor 11, a road surface sensor 12, an image sensor 13, a gyro sensor 14, a speedometer 15, a weather meter 16, an illuminance sensor 17, and a map database 18.

The distance sensor 11 is, for example, a radar, and detects the positions of vehicles which are present around the host vehicle and which are different vehicles different from the host vehicle.

The road surface sensor 12 is, for example, an infrared sensor, and detects the condition of a road surface. The condition of road surfaces include, for example, dry, wet, and covered with snow.

The image sensor 13 detects, for example, the type of a road surface by capturing an image of the road surface and performing image processing. The types of road surfaces include, for example, paved and unpaved. The image sensor 13 also detects, for example, the type of the different vehicle by capturing an image of a surrounding vehicle and performing image processing. The types of the different vehicles include, for example, passenger cars, trucks, kei cars (mini cars), vans, and two-wheelers.

The gyro sensor 14 detects the inclination of a road surface, such as flat, uphill, and downhill.

The speedometer 15 detects the traveling speed of the host vehicle.

The weather meter 16 includes, for example, a temperature sensor, a humidity sensor, and a raindrop sensor, and detects the weather.

The illuminance sensor 17 detects the illuminance.

The map database 18 is, for example, included in a navigation system and stores map data including information such as the types of roads, such as expressways and ordinary roads, the number of lanes, and the road width. The map database 18 detects the type of the road on which the host vehicle is traveling, the number of lanes of the road, and the road width of the road, for example using position information of a global positioning system (GPS).

Figure 2:
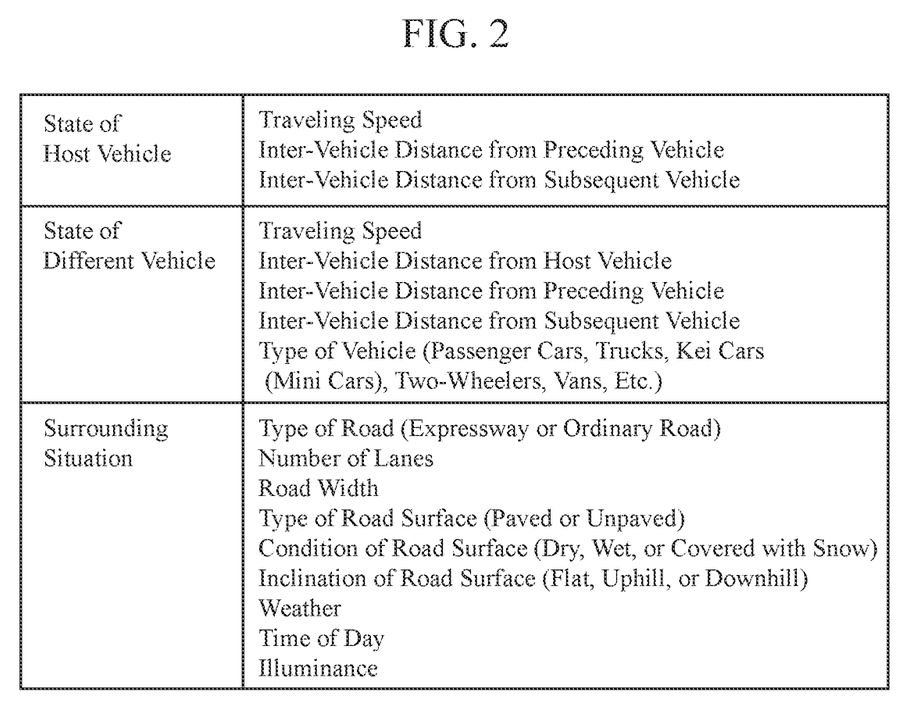
FIG. 2 is a table illustrating examples of the state of a host vehicle, the state of a different vehicle, and the surrounding situation detected by a surrounding situation detecting unit and a host vehicle state detecting unit in the first embodiment of the invention.

FIG. 2 is a table illustrating examples of the state of the host vehicle, the state of the different vehicle, and the surrounding situation detected by the surrounding situation detecting unit 21 and the host vehicle state detecting unit 22 in the first embodiment of the invention.

The surrounding situation detecting unit 21 uses detection results from the distance sensor 11, the road surface sensor 12, the image sensor 13, the gyro sensor 14, the speedometer 15, the weather meter 16, the illuminance sensor 17, and the map database 18 to detect the state of the different vehicle and the surrounding situation and outputs the detection results to the hazardous behavior determining unit 3 and the hazard predicting unit 6. As illustrated in FIG. 2, the state of the different vehicle includes, for example, the traveling speed of the different vehicle, the inter-vehicle distance between the different vehicle and the host vehicle, the inter-vehicle distance between the different vehicle and a preceding vehicle in front of the different vehicle, the inter-vehicle distance between the different vehicle and a subsequent vehicle behind the different vehicle, and the type of the different vehicle. The surrounding situation includes, for example, the type of the road on which the host vehicle is traveling, the number of lanes of the road, the road width of the road, the type of a road surface of the road, the condition of the road surface of the road, the inclination of the road surface of the road, the weather, the time of the day, and the illuminance. Note that the "situation of the road" especially refers to the type of the road, the number of lanes, the road width, the type of a road surface, the condition of the road surface, and the inclination of the road surface included in the surrounding situation.

The host vehicle state detecting unit 22 detects the state of the host vehicle using detection results from the distance sensor 11 and the speedometer 15 and outputs the detection result to the hazardous behavior determining unit 3 and the hazard predicting unit 6. As illustrated in FIG. 2, the state of the host vehicle includes, for example, the traveling speed of the host vehicle, the inter-vehicle distance between the host vehicle and a preceding vehicle, and the inter-vehicle distance between the host vehicle and a subsequent vehicle.

The communication unit 23 accesses the external database 24 by wireless communication to update data of the external database 24 and the onboard database 2. The communication unit 23 transmits data of the onboard database 2 to the external database 24 at a timing instructed by the driver, at predetermined intervals, or the like, and receives data of the external database 24 to store the data in the onboard database 2.

The onboard camera 25 captures images in the front, rear, left, and right directions of the host vehicle, and outputs the image data to the number detecting unit 4. The onboard camera 25 mainly captures images of license plates of the different vehicles present around the host vehicle.

The head-up display 26 is installed at a position which enables the driver of the host vehicle to visually recognize the head-up display 26. The head-up display 26 displays a hazard prediction result from the hazard predicting unit 6 under the control of the notification control unit 7. Note that, in this example the notification control unit 7 causes the head-up display 26 to display the hazard prediction result from the hazard predicting unit 6; however, the notification control unit 7 may cause a center display or the like to display the hazard prediction result, instead of the head-up display 26. In addition, the notification control unit 7 may cause an onboard speaker to output the hazard prediction result from the hazard predicting unit 6 by voice.

Figure 3:
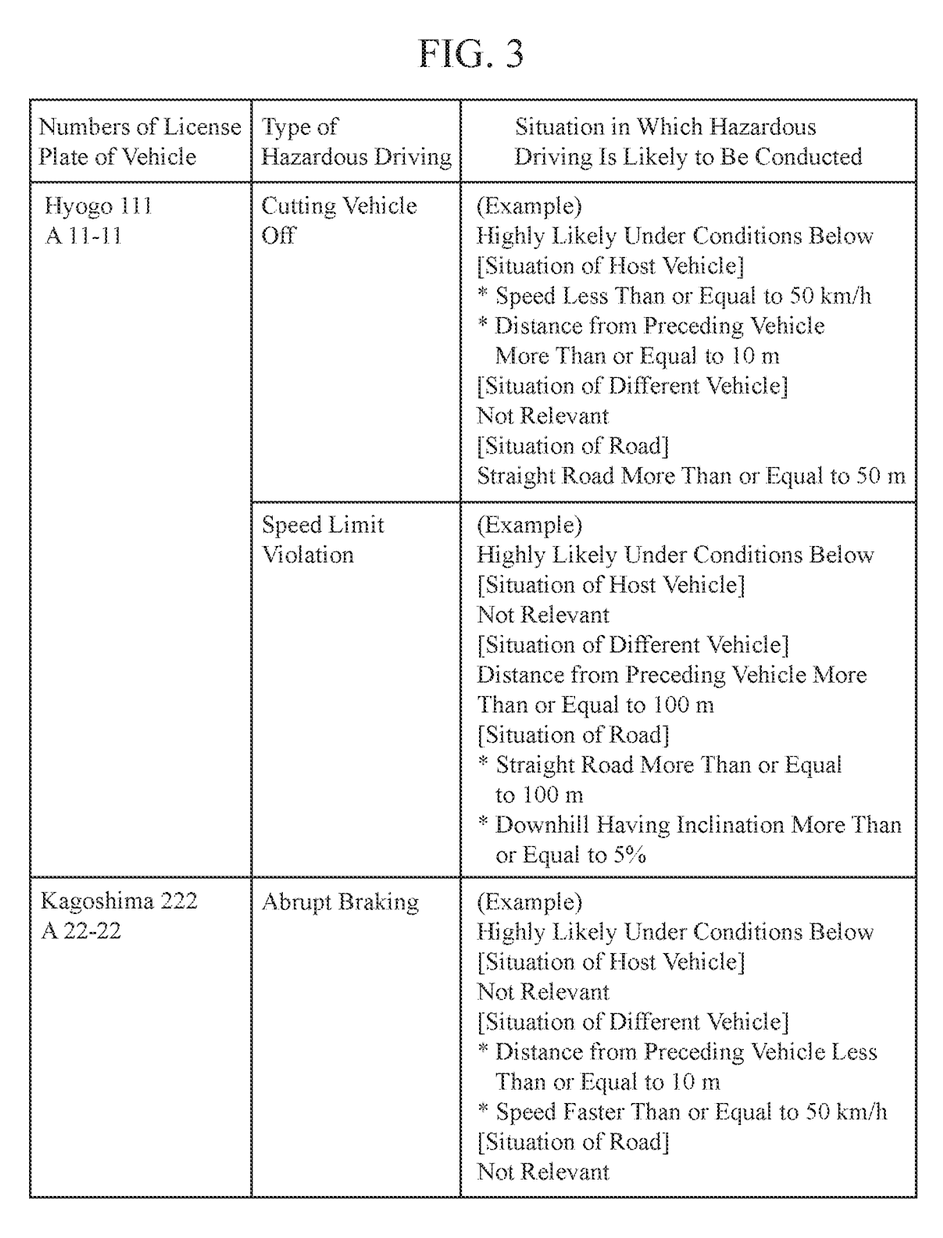
FIG. 3 is a table illustrating an example of hazardous vehicle information stored in an onboard database and an external database according to the first embodiment of the invention.

FIG. 3 is a table illustrating an example of hazardous vehicle information stored in the onboard database 2 and the external database 24 according to the first embodiment of the invention.

The hazardous vehicle information is information indicating at least the numbers of a license plate of a vehicle which conducts hazardous driving and the type of hazardous driving, and may further include information indicating a situation where hazardous driving is likely to be conducted in addition to the above information. The types of hazardous driving include, for example, at least one of ignoring the red light, cutting a vehicle off, speed limit violation, minimum speed violation, abrupt braking, deviating from a lane, abruptly changing lanes, and approaching. The situation where hazardous driving of the different vehicle is likely to be conducted indicates a driving tendency and habit of a driver of the different vehicle and is defined by at least one of a situation of the host vehicle, a situation of the different vehicle, and the situation of the road on which the host vehicle is traveling, for example. For example, a situation where a driver of the vehicle with a license plate of "Kagoshima 222 A 22-22" is likely to abruptly step on the brake is when an inter-vehicle distance between this vehicle and a preceding vehicle is less than or equal to 10 m and the traveling speed of this vehicle is greater than or equal to 50 km/h.

Note that although the situation of the host vehicle, the situation of the different vehicle, and the situation of the road are illustrated in FIG. 3 as examples of the situation where hazardous driving is likely to be conducted, situations such as the weather and time of the day may be used without being limited to the above situations.

The onboard database 2 stores, as hazardous vehicle information, numbers of a license plate of a vehicle determined by the hazardous behavior determining unit 3 described later, the type of hazardous driving of the vehicle, and the situation where the hazardous driving is likely to be conducted. The onboard database 2 transmits the hazardous vehicle information to the external database 24 via the communication unit 23. The onboard database 2 also receives hazardous vehicle information collected by the external database 24 from hazardous vehicle prediction devices 1 mounted on the different vehicles from the external database 24 via the communication unit 23 and stores the information. As a result, the hazardous vehicle information is kept identical between the onboard database 2 and the external database 24.

The onboard database 2 also stores behavior information indicating general behavior of hazardous driving. This behavior information includes not only information for detecting behavior of ongoing hazardous driving, but also information for detecting behavior that may lead to hazardous driving in the future. For example, the behavior information for detecting the type "approaching" of hazardous driving is information defining the behavior in which a subsequent vehicle travels while abnormally approaching the host vehicle.

The external database 24 collects hazardous vehicle information stored in onboard databases 2 of hazardous vehicle prediction devices 1 mounted on the host vehicle and the different vehicles by wireless communication, and stores the information. The external database 24 transmits the hazardous vehicle information to the onboard database 2 as necessary.

The external database 24 also stores the behavior information. When the behavior information is updated by the external organization owning the external database 24, the external database 24 transmits the updated behavior information to the onboard database 2 by wireless communication.

The hazardous behavior determining unit 3 receives information indicating the states of the different vehicles and information indicating the surrounding situation from the surrounding situation detecting unit 21, and receives information indicating the state of the host vehicle from the host vehicle state detecting unit 22. Using the received information and the behavior information stored in the onboard database 2, the hazardous behavior determining unit 3 determines a vehicle that is currently conducting or about to conduct hazardous driving from among surrounding vehicles and determines the type of the hazardous driving. Hereinafter, the vehicle determined by the hazardous behavior determining unit 3 is referred to as a "hazardous behavior vehicle". The hazardous behavior determining unit 3 outputs information indicating the hazardous behavior vehicle and the type of hazardous driving to the hazard predicting unit 6.

The number detecting unit 4 performs image processing on the image data captured by the onboard camera 25 to detect license plates of the different vehicles present around the host vehicle. The number detecting unit 4 outputs information of the detected license plates to the registered vehicle identifying unit 5.

The registered vehicle identifying unit 5 receives the information of the license plates from the number detecting unit 4. The registered vehicle identifying unit 5 collates the received numbers of the license plates with numbers in the hazardous vehicle information stored in the onboard database 2 to identify a vehicle corresponding to the hazardous vehicle information stored in the onboard database 2. Hereinafter, the vehicle identified by the registered vehicle identifying unit 5 is referred to as a "registered vehicle". The registered vehicle identifying unit 5 outputs information indicating the registered vehicle and hazardous vehicle information corresponding to the identified vehicle to the hazard predicting unit 6.

Note that the registered vehicle identifying unit 5 may collate the numbers of the license plates received from the number detecting unit 4 with numbers in the hazardous vehicle information stored in the onboard database 2 or with numbers in the hazardous vehicle information stored in the external database 24 via the communication unit 23. For example, in a case where sufficient hazardous vehicle information is not accumulated in the onboard database 2, the registered vehicle identifying unit 5 uses the external database 24.

The hazard predicting unit 6 receives the information indicating the hazardous behavior vehicle and the type of hazardous driving from the hazardous behavior determining unit 3, and receives the information indicating the registered vehicle and the hazardous vehicle information from the registered vehicle identifying unit 5. The hazard predicting unit 6 predicts the risk to the host vehicle using these pieces of received information and outputs the hazard prediction result to the notification control unit 7. Note that the hazard predicting unit 6 may use at least one of the information indicating the state of the different vehicle and the information indicating the surrounding situation detected by the surrounding situation detecting unit 21, the information indicating the state of the host vehicle detected by the host vehicle state detecting unit 22, and the hazardous vehicle information stored in the onboard database 2 in order to predict the risk to the host vehicle. Exemplary processing by the hazard predicting unit 6 will be described in detail with reference to FIG. 5.

The hazard predicting unit 6 generates hazardous vehicle information by adding the numbers detected by the number detecting unit 4 and information indicating situations where hazardous driving is likely to be conducted and which have been detected by the surrounding situation detecting unit 21 and the host vehicle state detecting unit 22 to the hazardous behavior vehicle and the type of hazardous driving determined by the hazardous behavior determining unit 3. The hazard predicting unit 6 stores the generated hazardous vehicle information in the onboard database 2.

The notification control unit 7 receives the hazard prediction result from the hazard predicting unit 6. The notification control unit 7 controls, on the basis of the received hazard prediction result, the head-up display 26 to notify the driver of the host vehicle of the risk in a case where there is a hazardous vehicle to the host vehicle. Examples of the hazard notification will be described in detail with reference to FIGS. 7 and 9.

Figure 4:
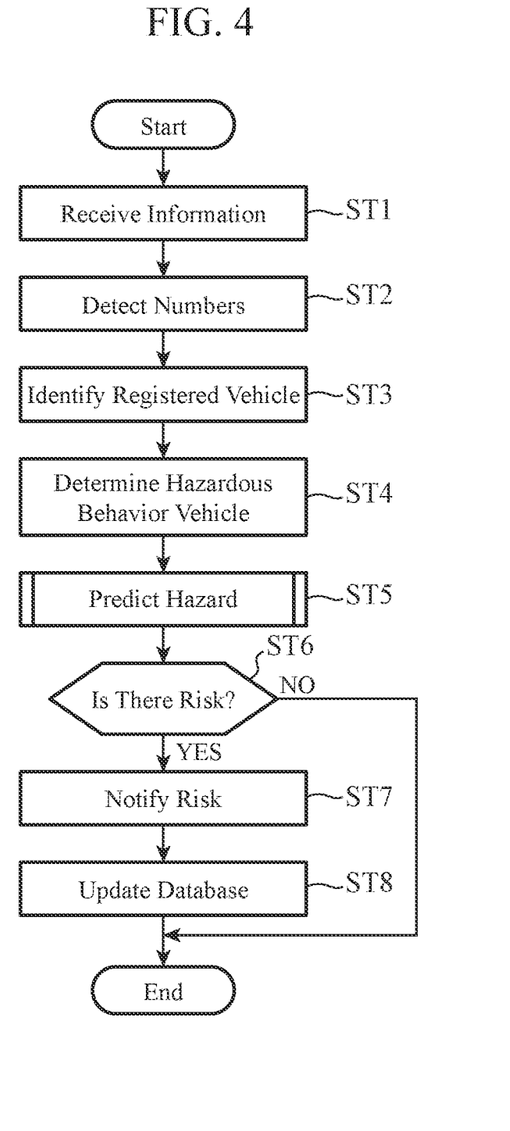
FIG. 4 is a flowchart illustrating exemplary operation of a hazardous vehicle prediction device according to the first embodiment of the invention.

Next, exemplary operation of the hazardous vehicle prediction device 1 according to the first embodiment of the present invention will be described. FIG. 4 is a flowchart illustrating exemplary operation of the hazardous vehicle prediction device 1 according to the first embodiment of the invention. The hazardous vehicle prediction device 1 repeatedly performs the processing illustrated in the flowchart of FIG. 4.

In step ST1, corresponding components of the hazardous vehicle prediction device 1 receive information indicating the states of the different vehicles and information indicating the surrounding situation from the surrounding situation detecting unit 21, information indicating the state of the host vehicle from the host vehicle state detecting unit 22, and image data from the onboard camera 25.

In step ST2, the number detecting unit 4 performs image processing on the image data received from the onboard camera 25 to detect license plates of the different vehicles present around the host vehicle.

In step ST3, the registered vehicle identifying unit 5 collates the numbers of the license plates detected by the number detecting unit 4 with numbers in hazardous vehicle information stored in the onboard database 2 or the external database 24 to identify a registered vehicle from among the different vehicles present around the host vehicle.

In step ST4, the hazardous behavior determining unit 3 determines a hazardous behavior vehicle from among the different vehicles present around the host vehicle and the type of hazardous driving of the hazardous behavior vehicle using the information received from the surrounding situation detecting unit 21 and the host vehicle state detecting unit 22 and the behavior information stored in the onboard database 2. At that time, the hazardous behavior determining unit 3 may determine the hazardous behavior vehicle and the type of hazardous driving using the information indicating the situation where hazardous driving is likely to be conducted in addition to the behavior information stored in the onboard database 2.

In step ST5, the hazard predicting unit 6 predicts the risk to the host vehicle using the determination result from the hazardous behavior determining unit 3 and the identification result from the registered vehicle identifying unit 5.

Figure 5:
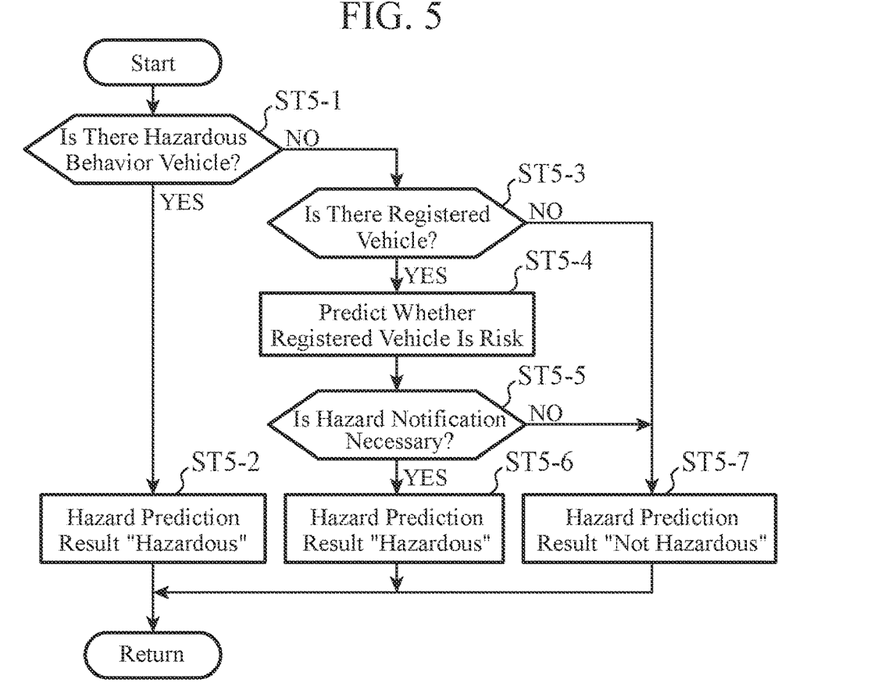
FIG. 5 is a flowchart illustrating detailed processing in step ST5 in FIG. 4.

FIG. 5 is a flowchart illustrating detailed processing in step ST5 in FIG. 4.

In step ST5-1, the hazard predicting unit 6 determines whether the hazardous behavior determining unit 3 has determined the presence of a hazardous behavior vehicle in step ST4. If the presence of a hazardous behavior vehicle has been determined (step ST5-1 "YES"), the hazard predicting unit 6 sets the hazard prediction result to "hazardous" in step ST5-2. On the other hand, if the presence of a hazardous behavior vehicle has not been determined (step ST5-1 "NO"), the hazard predicting unit 6 causes step ST5-3 to be performed.

In step ST5-3, the hazard predicting unit 6 determines whether the registered vehicle identifying unit 5 has identified a registered vehicle in step ST3. If a registered vehicle has been identified (step ST5-3 "YES"), the hazard predicting unit 6 causes step ST5-4 to be performed. On the other hand, if no registered vehicle has been identified (step ST5-3 "NO"), the hazard predicting unit 6 sets the hazard prediction result to "not hazardous" in step ST5-7.

In step ST5-4, the hazard predicting unit 6 predicts whether the registered vehicle is a risk by collating the situations where hazardous driving is likely to be conducted and which are included in the hazardous vehicle information corresponding to the registered vehicle identified by the registered vehicle identifying unit 5 with the information received from the surrounding situation detecting unit 21 and the host vehicle state detecting unit 22. For example, the hazard predicting unit 6 predicts that the registered vehicle has a high risk of violating the speed limit on the basis of the hazardous vehicle information illustrated in FIG. 3 in the case where the numbers of the license plate of the registered vehicle are "Hyogo 111 A 11-11", the distance between the registered vehicle and a preceding vehicle is greater than or equal to 100 m, and, the road on which the host vehicle is traveling extends straight for at least 100 m and is a downhill having an inclination greater than or equal to 5%. On the other hand, in a case where the registered vehicle having the numbers "Hyogo 111 A 11-11" is not in a situation where hazardous driving is likely to be conducted, the hazard predicting unit 6 predicts that there is no risk.

In step ST5-5, if the hazard predicting unit 6 has predicted in step ST5-4 that the registered vehicle is hazardous (step ST5-5 "YES"), the hazard predicting unit 6 sets the hazard prediction result to "hazardous" in step ST5-6. On the other hand, if the hazard predicting unit 6 has predicted that the registered vehicle is not hazardous (step ST5-5 "NO"), the hazard predicting unit 6 sets the hazard prediction result to "not hazardous" in step ST5-7.

The hazard predicting unit 6 causes step ST6 of FIG. 4 to be performed after step ST5-2, ST5-6, or ST5-7.

In step ST6 of FIG. 4, the hazard predicting unit 6 determines whether there is a risk to the host vehicle on the basis of the hazard prediction result in step ST5. If the hazard prediction result is "hazardous" (step ST6 "YES"), the hazard predicting unit 6 causes step ST7 to be performed, and if it is "not hazardous" (step ST6 "NO"), the hazard predicting unit 6 skips steps ST7 and ST8 and terminates the processing in FIG. 4.

In step ST7, the notification control unit 7 receives the hazard prediction result from the hazard predicting unit 6 and causes the head-up display 26 to display the hazard prediction result.

In step ST8, the hazard predicting unit 6 generates hazardous vehicle information by adding the numbers detected by the number detecting unit 4 and information indicating situations where hazardous driving is likely to be conducted and which have been detected by the surrounding situation detecting unit 21 and the host vehicle state detecting unit 22 to the hazardous behavior vehicle and the type of hazardous driving determined by the hazardous behavior determining unit 3, and stores the generated hazardous vehicle information in the onboard database 2.

Note that, for example after step ST8, the communication unit 23 may transmit the hazardous vehicle information added to the onboard database 2 by the hazard predicting unit 6 to the external database 24 to update the data of the external database 24. The communication unit 23 may update the data of the onboard database 2 by receiving hazardous vehicle information which is included in the external database 24 and is not included in the onboard database 2.

In addition, in step ST6 of FIG. 4, the hazard predicting unit 6 may determine a risk level in addition to performing the determination whether there is a risk to the host vehicle on the basis of the hazard prediction result in step ST5.

The hazard predicting unit 6 performs risk level determination in which, for example, two levels of "CAUTION" having a relatively low risk level and "DANGER" having a relatively high risk level exist. "CAUTION" refers to a state in which a vehicle that requires a driver's attention, that is, a vehicle with an indication of hazardous driving, is present around the host vehicle. "DANGER" refers to a state in which a vehicle hazardous to a driver is present around the host vehicle.

When, in the hazard prediction processing in step ST5, there is no hazardous behavior vehicle but there is a registered vehicle and behavior of the registered vehicle and the surrounding situation match the situation where hazardous driving is likely to be conducted as illustrated in FIG. 3, the hazard predicting unit 6 determines that the risk level is "CAUTION". In other words, the hazard prediction result "hazardous" in step ST5-6 corresponds to the risk level of "CAUTION".

When a hazardous behavior vehicle is present in the hazard prediction processing in step ST5, the hazard predicting unit 6 determines that the risk level is "DANGER". In other words, the hazard prediction result "hazardous" in step ST5-2 corresponds to the risk level of "DANGER".

Furthermore, in step ST7 of FIG. 4, the notification control unit 7 may change the display mode of the hazard prediction result to be displayed on the head-up display 26 depending on the risk level received from the hazard predicting unit 6. An example of the display mode of the hazard prediction result depending on the risk level will be described with reference to FIG. 7.

Next, exemplary operation of the hazardous vehicle prediction device 1 will be described.

[First Exemplary Situation]

Figure 6:
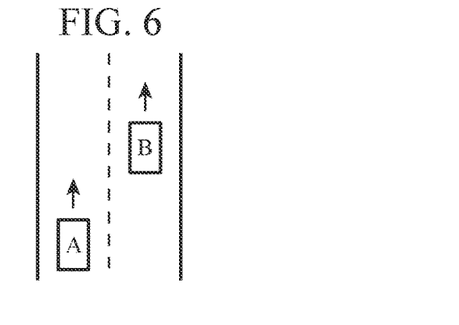
FIG. 6 is a diagram illustrating a first exemplary situation for explaining exemplary operation of the hazardous vehicle prediction device according to the first embodiment of the invention.
Figure 7:
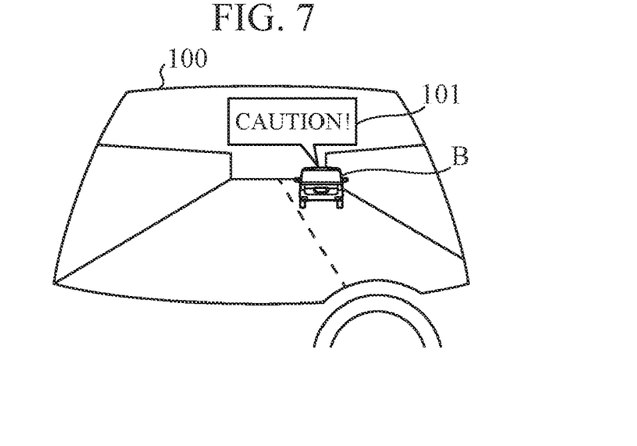
FIG. 7 is a view illustrating exemplary display of a head-up display in the first exemplary situation illustrated in FIG. 6.

FIG. 6 is a diagram illustrating a first exemplary situation for explaining exemplary operation of the hazardous vehicle prediction device 1 according to the first embodiment of the invention. FIG. 7 is a view illustrating exemplary display of the head-up display 26 in the first exemplary situation illustrated in FIG. 6.

In the first exemplary situation, a registered vehicle B is traveling diagonally forward right of a host vehicle A without conducting hazardous behavior so far while the host vehicle A is traveling on a left lane of a road having two lanes each way as illustrated in FIG. 6. The registered vehicle B is stored in the onboard database 2 as a vehicle that frequently conducts the type of hazardous driving "cutting a vehicle off".

Since the hazardous vehicle prediction device according to Patent Literature 1 described above notifies a risk when the registered vehicle B is detected, a hazard notification that is unnecessary for the driver is performed.

The hazardous vehicle prediction device according to Patent Literature 2 described above cannot predict a hazard since the registered vehicle B has not yet conducted hazardous behavior.

On the other hand, the hazardous vehicle prediction device 1 according to the first embodiment of the present invention is capable of determining that it is hazardous when a situation of the registered vehicle B, a situation of the host vehicle A, and the like match the situation where hazardous driving is likely to be conducted and which is stored in the onboard database 2. Therefore, it is possible to avoid unnecessary hazard notifications at the time of detection of numbers of a license plate of the registered vehicle B. In addition, since the situation where hazardous driving is likely to be conducted is a situation prior to occurrence of the hazardous driving, it is possible to predict and notify the hazardous driving in advance.

In the example illustrated in FIG. 7, the head-up display 26 uses the entire surface of a windshield 100 of the host vehicle A as a display area. A driver visually recognizes the registered vehicle B in front through the windshield 100. In a case where the hazard predicting unit 6 has predicted that the registered vehicle B is hazardous, the notification control unit 7 controls the head-up display 26 to display a hazard notification icon 101 at the position of the registered vehicle B on the windshield 100. In the example illustrated in FIG. 7, since the risk level is "CAUTION", the characters "CAUTION!" are displayed as the hazard notification icon 101. Although not illustrated, in the case where the risk level is "DANGER", the characters "DANGER!" are displayed as the hazard notification icon 101.

Note that although the registered vehicle B is emphasized by the hazard notification icon 101 in the example illustrated in FIG. 7, any emphasizing method may be used. In addition, the notification control unit 7 may notify the driver of what type of hazard is imminent for the host vehicle A by causing a hazard notification icon 101 corresponding to the type of hazardous driving of the registered vehicle B to be displayed.

Figure 8:
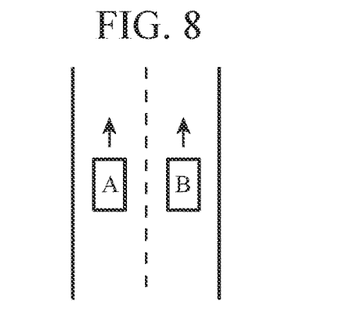
FIG. 8 is a diagram illustrating a similar scene to the first exemplary situation illustrated in FIG. 6.
Figure 9:
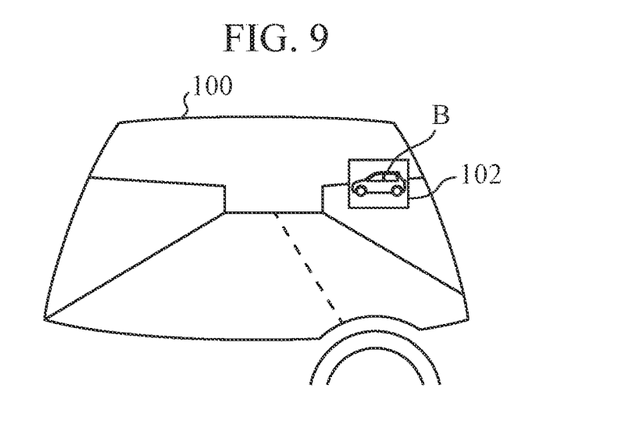
FIG. 9 is a view illustrating exemplary display of the head-up display in the similar scene to the first exemplary situation illustrated in FIG. 8.

A similar scene to the first exemplary situation is illustrated in FIG. 8, and exemplary display of the head-up display in the similar scene is illustrated in FIG. 9. As illustrated in FIG. 8, in the case where the registered vehicle B is traveling to the right of the host vehicle A, the registered vehicle B is not present within the display area of the head-up display 26, that is, not within the windshield 100. In this case, the notification control unit 7 controls the head-up display 26 to display an image of the registered vehicle B captured by the onboard camera 25 as a hazardous vehicle image 102 on the right side of the windshield 100. The notification control unit 7 causes the hazardous vehicle image 102 to be displayed on the left side of the windshield 100 when the registered vehicle B is traveling to the left of the host vehicle A, and causes the hazardous vehicle image 102 to be displayed on the bottom of the windshield 100 when the registered vehicle B is traveling behind the host vehicle A. In this manner, by changing the position at which the hazardous vehicle image 102 is displayed depending on the positional relationship between the host vehicle A and the registered vehicle B, the notification control unit 7 can notify the driver of the position of the registered vehicle B when the registered vehicle B is present outside the display area of the head-up display 26. Note that a method of notifying the driver of information indicating the position of the registered vehicle B is not limited to the above, and any method may be used.

[Second Exemplary Situation]

Figure 10:
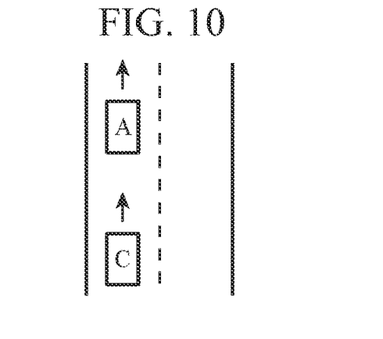
FIG. 10 is a diagram illustrating a second exemplary situation for explaining exemplary operation of the hazardous vehicle prediction device according to the first embodiment of the invention.

FIG. 10 is a diagram illustrating a second exemplary situation for explaining exemplary operation of the hazardous vehicle prediction device 1 according to the first embodiment of the invention.

In the second exemplary situation, a registered vehicle C is traveling behind the host vehicle A without conducting hazardous behavior so far while the host vehicle A is traveling on a left lane of a road having two lanes each way as illustrated in FIG. 10. This road is a downhill with a speed limit of 50 km/h and an inclination greater than or equal to 5%. The registered vehicle C is stored in the onboard database 2 as a vehicle that frequently conducts the type of hazardous driving "speed limit violation" in the above road situation.

Although the hazardous vehicle prediction device according to Patent Literature 1 described above notifies a risk when numbers of the license plate of the registered vehicle C is detected, a driver of the host vehicle A does not know what type of hazard is imminent.

The hazardous vehicle prediction device according to Patent Literature 2 described above cannot predict a hazard since the registered vehicle C has not yet conducted hazardous behavior.

On the other hand, the hazardous vehicle prediction device 1 according to the first embodiment of the present invention is capable of determining that there is a risk "speed limit violation" and performing notification at the time when a situation of the registered vehicle C, a situation of the road, and the like match the situation in which hazardous driving is likely to be conducted and which is stored in the onboard database 2. Therefore, it is possible for the driver of the host vehicle A to be careful of the case where the registered vehicle C overtakes abruptly while violating the speed limit.

Figure 11:
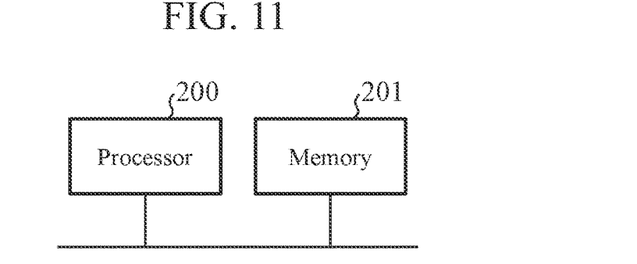
FIG. 11 is a hardware configuration diagram illustrating an exemplary hardware configuration of the hazardous vehicle prediction device according to the first embodiment of the invention.

Next, an exemplary hardware configuration of the hazardous vehicle prediction device 1 according to the first embodiment of the present invention will be described. FIG. 11 is a hardware configuration diagram illustrating the exemplary hardware configuration of the hazardous vehicle prediction device 1 according to the first embodiment of the invention.

The functions of the hazardous behavior determining unit 3, the number detecting unit 4, the registered vehicle identifying unit 5, the hazard predicting unit 6, and the notification control unit 7 in the hazardous vehicle prediction device 1 are implemented by software, firmware, or a combination of software and firmware. The software or the firmware is described as a program and is stored in a memory 201. A processor 200 reads and executes the program stored in the memory 201 and thereby implements the functions of the respective units. In other words, the hazardous vehicle prediction device 1 includes the memory 201 for storing the program, execution of which by the processor 200 results in execution of the steps illustrated in the flowcharts of FIGS. 4 and 5 described above. It can also be said that this program causes a computer to execute procedures or methods which the hazardous behavior determining unit 3, the number detecting unit 4, the registered vehicle identifying unit 5, the hazard predicting unit 6, and the notification control unit 7 use.

In this embodiment, the processor 200 may be a central processing unit (CPU), a processing device, a computing device, a microprocessor, a microcomputer, or the like.

The memory 201 may be a nonvolatile or volatile semiconductor memory such as a random access memory (RAM), a read only memory (ROM), an erasable programmable ROM (EPROM), or a flash memory, a magnetic disk such as a hard disk or a flexible disk, or an optical disk such as a compact disc (CD) or a digital versatile disc (DVD).

The onboard database 2 in the hazardous vehicle prediction device 1 is included in the memory 201.

Note that the functions of the surrounding situation detecting unit 21 and the host vehicle state detecting unit 22 may be implemented by the processor 200 executing a program stored in the memory 201, or may be implemented by another processor other than the processor 200 executing a program stored in another memory other than the memory 201.

As described above, the hazardous vehicle prediction device 1 according to the first embodiment includes the onboard database 2, the hazardous behavior determining unit 3, the number detecting unit 4, the registered vehicle identifying unit 5, the hazard predicting unit 6, and the notification control unit 7. The onboard database 2 stores the behavior information indicating the behavior of hazardous driving, as well as the hazardous vehicle information indicating numbers of license plates of vehicles that have conducted hazardous driving before and the types of hazardous driving of the vehicles. The hazardous behavior determining unit 3 determines a vehicle that is conducting or is likely to conduct hazardous driving from among surrounding vehicles and a type of the hazardous driving using information indicating the state of the host vehicle detected by the host vehicle state detecting unit 22, information indicating the states of the vehicles and the surrounding situation detected by the surrounding situation detecting unit 21, and the behavior information stored in the onboard database 2. The number detecting unit 4 detects license plates from imaging data on the surrounding vehicles captured by the onboard camera 25 mounted on the host vehicle. The registered vehicle identifying unit 5 identifies a vehicle that corresponds to the hazardous vehicle information stored in the onboard database 2 by collating numbers of the license plates detected by the number detecting unit 4 with the numbers stored in the onboard database 2. The hazard predicting unit 6 predicts a risk to the host vehicle using the determination result from the hazardous behavior determining unit 3 and the identification result from the registered vehicle identifying unit 5. The notification control unit 7 performs control to notify the driver of the host vehicle of the prediction result from the hazard predicting unit 6. As a result, it is possible to promptly predict hazardous driving of the different vehicles present around the host vehicle and to suppress unnecessary notifications.

Moreover, the onboard database 2 stores information on at least one of the situation of the host vehicle, the situations of other vehicles, and the situation of a road, each of which is a situation in which hazardous driving is likely to be conducted, in the first embodiment. The hazardous behavior determining unit 3 determines a vehicle that is conducting or is likely to conduct hazardous driving and the type of the hazardous driving using the behavior information and the information on the situation where hazardous driving is likely to be conducted stored in the onboard database 2. In addition, the hazard predicting unit 6 predicts whether the vehicle identified by the registered vehicle identifying unit 5 is likely to conduct hazardous driving and the type of the hazardous driving using the behavior information and the information on the situation where hazardous driving is likely to be conducted stored in the onboard database 2.

Thus, it is possible to predict what type of hazardous driving the different vehicles present around the host vehicle will conduct. In addition, it is possible to perform hazard prediction in consideration of driving tendencies and habits of drivers. On the other hand, the approach described in Patent Literature 1 cannot predict what type of hazardous driving a detected vehicle will conduct. In the approach described in Patent Literature 2, since the driving tendencies and habits of drivers are not considered, it is not possible to perform hazard prediction depending on the driving tendencies and the like.

The notification control unit 7 of the first embodiment controls the display of the head-up display 26. The notification control unit 7 highlights a hazardous vehicle on the display in a case where the hazardous vehicle is present in the display area of the head-up display 26, whereas in a case where the hazardous vehicle is present outside the display area of the head-up display 26, the notification control unit 7 displays image data on the hazardous vehicle captured by the onboard camera 25 and information indicating the position of the hazardous vehicle in the display area of the head-up display 26. Using the head-up display 26 enables the driver to reduce movement of his/her line of sight. Thus, compared with notifications by sound, the driver can grasp the risk while staying focused on driving. This also enables the driver to visually grasp which vehicle is hazardous.

Furthermore, the onboard database 2 of the first embodiment is updated to the latest information by accessing the external database 24. The external database 24 stores a large amount of hazardous vehicle information collected from hazardous vehicle prediction devices 1 mounted on the different vehicles. Therefore, by updating the hazardous vehicle information of the onboard database 2 using the hazardous vehicle information of the external database 24, reliability of data used by the hazard predicting unit 6 and other components is enhanced.

Note that although the example in which the functions of the hazardous vehicle warning system excluding that of the external database 24 are mounted in a vehicle has been described in the first embodiment, some of the functions of the hazardous vehicle warning system may be mounted on the vehicle while the remaining functions are installed outside the vehicle. For example, in the case where the hazardous vehicle prediction device 1 is installed outside the vehicle and the other functions are installed in the vehicle, the communication unit 23 transmits data of the surrounding situation detecting unit 21, the host vehicle state detecting unit 22, and the onboard camera 25 to the hazardous vehicle prediction device 1 outside the vehicle by wireless communication. Then, the communication unit 23 receives a hazard prediction result from the hazardous vehicle prediction device 1 by wireless communication and outputs the result to the head-up display 26.

The hazardous vehicle prediction device 1 may be a portable terminal such as a smartphone that can be carried into the vehicle.

Note that the present invention may include a modification of any component of the embodiment or omission of any component of the embodiment within the scope of the invention.

INDUSTRIAL APPLICABILITY

Since a hazardous vehicle prediction device according to the present invention predicts a hazard to a host vehicle, the hazardous vehicle prediction device is suitable for use in a hazardous vehicle warning system or the like for warning the driver of the hazard to the host vehicle.

REFERENCE SIGNS LIST

1: Hazardous vehicle prediction device, 2: Onboard database, 3: Hazardous behavior determining unit, 4: Number detecting unit, 5: Registered vehicle identifying unit, 6: Hazard predicting unit, 7: Notification control unit, 10: Onboard information source, 11: Distance sensor, 12: Road surface sensor, 13: Image sensor, 14: Gyro sensor, 15: Speedometer, 16: Weather meter, 17: Illuminance sensor, 18: Map database, 21: Surrounding situation detecting unit, 22: Host vehicle state detecting unit, 23: Communication unit, 24: External database, 25: Onboard camera, 26: Head-up display, 100: Windshield, 101: Hazard notification icon, 102: Hazardous vehicle image, 200: Processor, 201: Memory.

The invention claimed is:

1. A hazardous vehicle prediction device comprising:
a processor to execute a program; and
a memory to store a database storing behavior information indicating behavior of hazardous driving and hazardous vehicle information indicating numbers of a license plate of a vehicle which has conducted hazardous driving before and a type of the hazardous driving of the vehicle, and to store the program which, when executed by the processor, performs processes of,
determining a vehicle that is conducting or is likely to conduct hazardous driving from among one or more vehicles around a host vehicle and a type of the hazardous driving using information indicating states of the host vehicle and the vehicles and a surrounding situation and the behavior information stored in the database;
detecting a license plate from image data on the vehicles captured by a camera mounted on the host vehicle;
identifying a vehicle that corresponds to the hazardous vehicle information stored in the database by collating numbers of the license plate detected with the numbers stored in the database;
predicting a risk to the host vehicle using the determination result and the identification result; and
performing control to notify a driver of the host vehicle of the prediction result, wherein
the processes further include controlling display of a head-up display mounted on the host vehicle, highlighting a hazardous vehicle on the display in a case where the hazardous vehicle is present in a display area of the head-up display, and displaying image data on the hazardous vehicle captured by the camera and information indicating a position of the hazardous vehicle in the display area of the head-up display in a case where the hazardous vehicle is present outside the display area of the head-up display.

2. The hazardous vehicle prediction device according to claim 1,
wherein the database stores information on at least one of a situation of the host vehicle, a situation of a vehicle, and a situation of a road, each of which is a situation in which hazardous driving is likely to be conducted, and
the processes further include determining a vehicle that is conducting or is likely to conduct hazardous driving and a type of the hazardous driving using the behavior information and the information on the situation in which hazardous driving is likely to be conducted, both of which are stored in the database.

3. The hazardous vehicle prediction device according to claim 1,
   wherein the database stores information on at least one of a situation of the host vehicle, a situation of a vehicle, and a situation of a road, each of which is a situation in which hazardous driving is likely to be conducted, and
   the processes further include predicting whether the vehicle identified is likely to conduct hazardous driving and a type of the hazardous driving using the information on the situation in which hazardous driving is likely to be conducted, stored in the database.

4. The hazardous vehicle prediction device according to claim 1, wherein types of hazardous driving include at least one of ignoring a red light, cutting a vehicle off, speed limit violation, minimum speed violation, abrupt braking, deviating from a lane, abruptly changing lanes, and approaching.

5. The hazardous vehicle prediction device according to claim 1, wherein the database is mounted on the host vehicle and is updated to latest information by accessing an external database.

6. A hazardous vehicle warning system comprising:
   the hazardous vehicle prediction device according to claim 1; and
   a head-up display to display the prediction result from the hazardous vehicle prediction device.

7. A hazardous vehicle prediction method comprising:
   referring to a database storing behavior information indicating behavior of hazardous driving and hazardous vehicle information indicating numbers of a license plate of a vehicle which has conducted hazardous driving before and a type of the hazardous driving of the vehicle and determining a vehicle that is conducting or is likely to conduct hazardous driving from among one or more vehicles around a host vehicle and a type of the hazardous driving using information indicating states of the host vehicle and the vehicles and a surrounding situation and the behavior information stored in the database;
   detecting a license plate from image data on the vehicles captured by a camera mounted on the host vehicle;
   identifying a vehicle that corresponds to the hazardous vehicle information stored in the database by collating numbers of the license plate detected with the numbers stored in the database;
   predicting a risk to the host vehicle using the determination result and the identification result;
   performing control to notify a driver of the host vehicle of the prediction result;
   controlling display of a head-up display mounted on the host vehicle;
   highlighting a hazardous vehicle on the display in a case where the hazardous vehicle is present in a display area of the head-up display; and
   displaying image data on the hazardous vehicle captured by the camera and information indicating a position of the hazardous vehicle in the display area of the head-up display in a case where the hazardous vehicle is present outside the display area of the head-up display.

\* \* \* \* \*